United States Patent
Yoon et al.

(10) Patent No.: US 11,745,649 B2
(45) Date of Patent: Sep. 5, 2023

(54) VEHICLE PANEL INCLUDING A PERFORATED PATTERN AND A METHOD OF MANUFACTURING SAME

(71) Applicants: HYUNDAI MOTOR COMPANY, Seoul (KR); KIA CORPORATION, Seoul (KR); Hwan Gil Lee, Busan (KR)

(72) Inventors: Sung Ho Yoon, Suwon-si (KR); Sun Jae Lee, Yangsan-si (KR); Hyun Jin Lee, Busan (KR)

(73) Assignees: HYUNDAI MOTOR COMPANY, Seoul (KR); KIA CORPORATION, Seoul (KR); Hwan Gil Lee, Busan (KR)

( * ) Notice: Subject to any disclaimer, the term of this patent is extended or adjusted under 35 U.S.C. 154(b) by 1 day.

(21) Appl. No.: 17/553,043

(22) Filed: Dec. 16, 2021

(65) Prior Publication Data

US 2023/0001850 A1     Jan. 5, 2023

(30) Foreign Application Priority Data

Jul. 1, 2021    (KR) ........................ 10-2021-0086191

(51) Int. Cl.
    *B60Q 3/14*          (2017.01)
    *B62D 65/14*        (2006.01)
    *B60Q 3/64*          (2017.01)
    *F21V 8/00*           (2006.01)

(52) U.S. Cl.
CPC ................. *B60Q 3/14* (2017.02); *B60Q 3/64* (2017.02); *B62D 65/14* (2013.01); *G02B 6/0036* (2013.01)

(58) Field of Classification Search
CPC . B60Q 3/14; B60Q 3/64; B62D 65/14; G02B 6/0036
See application file for complete search history.

(56) References Cited

U.S. PATENT DOCUMENTS

| | | | |
|---|---|---|---|
| 4,965,950 A | * | 10/1990 | Yamada .................... B60Q 1/56 362/613 |
| 10,160,405 B1 | * | 12/2018 | Salter ......................... F21V 9/30 |
| 2005/0213351 A1 | * | 9/2005 | Yang ........................ B60R 13/04 362/23.1 |
| 2007/0205986 A1 | | 9/2007 | Kim et al. |

(Continued)

FOREIGN PATENT DOCUMENTS

| | | |
|---|---|---|
| JP | H01110283 A | 4/1989 |
| JP | 2006318718 A | 11/2006 |
| KR | 20130115600 A | 10/2013 |

*Primary Examiner* — Leah Simone Macchiarolo
(74) *Attorney, Agent, or Firm* — LEMPIA SUMMERFIELD KATZ LLC (57) ABSTRACT

A vehicle panel including a perforated pattern and a method of manufacturing the same, whereby a pattern can be realized through minimal means and a simple method, thereby reducing the amount of time taken and the expense incurred for the production of a product. Additionally, large-area patterning is possible, so the method can be applied to large parts. Moreover, the vehicle panel is capable of realizing a uniform lighting pattern without variation in luminance. When power is turned off, only a perforated pattern is viewed and, when power is turned on, a logical pattern with various designs is viewed, advantageously improving the aesthetic appearance of metal parts.

13 Claims, 7 Drawing Sheets

(56) References Cited

U.S. PATENT DOCUMENTS

| | | | |
|---|---|---|---|
| 2009/0251920 A1* | 10/2009 | Kino | G09F 13/18 |
| | | | 362/602 |
| 2012/0074725 A1* | 3/2012 | Jeon | B60R 13/02 |
| | | | 362/509 |
| 2014/0119038 A1* | 5/2014 | Mulder | B60Q 1/325 |
| | | | 362/311.03 |
| 2021/0300265 A1* | 9/2021 | Piccin | B60K 37/02 |
| 2022/0106003 A1* | 4/2022 | Salvaggio, Jr. | B62J 23/00 |

* cited by examiner

VEHICLE PANEL INCLUDING A PERFORATED PATTERN AND A METHOD OF MANUFACTURING SAME

CROSS-REFERENCE TO RELATED APPLICATION

This application claims under 35 U.S.C. § 119(a) the benefit of priority to Korean Patent Application No. 10-2021-0086191, filed on Jul. 1, 2021, the entire contents of which are incorporated herein by reference.

BACKGROUND

(a) Technical Field

The present disclosure relates to a vehicle panel including a perforated pattern and a method of manufacturing the same.

(b) Background Art

Conventional lighting through characters or patterns using metal, etc. is implemented only through a complicated process.

A complicated process, particularly a computer numerical control (CNC) process, enables various elaborate characters or patterns to be realized, but consumes a lot of time and expense for the process and may be applied only to relatively small parts, which is undesirable.

SUMMARY OF THE DISCLOSURE

Accordingly, an objective of the present disclosure is to provide a vehicle panel including a panel body having a perforated pattern portion including, as a perforated pattern, a plurality of patterned perforations in the form of through-holes. The panel body also has a transparent portion including a plate layer located on the lower surface of the perforated pattern portion and a plurality of convex layers formed in the plurality of patterned perforations. The vehicle panel also includes a lighting unit located so as to emit light from the inner surface of the panel body. The lighting unit includes a light guide plate provided at a corresponding position on the panel body and including, as a three-dimensional pattern, a plurality of patterned intaglios engraved in the rear surface thereof. The lighting unit also includes a light source provided at the lateral side of the light guide plate.

Another objective of the present disclosure is to provide a method of manufacturing a vehicle panel. The method includes: manufacturing a perforated pattern portion by press-perforating a metal sheet to form a plurality of patterned perforations in the form of through-holes; attaching a protective tape to the upper surface of the perforated pattern portion; subjecting the perforated pattern portion having the protective tape attached thereto to sheet pressing; manufacturing a panel body by insert-injecting the pressed metal sheet to integrate a transparent portion including a plate layer and a plurality of convex layers with the perforated pattern portion; removing the protective tape; and locating a lighting unit so as to correspond to the panel body.

An embodiment of the present disclosure provides a vehicle panel including a panel body having a perforated pattern portion including, as a perforated pattern, a plurality of patterned perforations in the form of through-holes and including a transparent portion having a plate layer located on the lower surface of the perforated pattern portion and a plurality of convex layers formed in the plurality of patterned perforations. The vehicle also includes a lighting unit located so as to emit light from the inner surface of the panel body. The lighting unit includes a light guide plate provided at a corresponding position on the panel body and including, as a three-dimensional pattern, a plurality of patterned intaglios engraved in the rear surface thereof, and includes a light source provided at a lateral side of the light guide plate.

The perforated pattern portion may be a metal sheet selected from the group consisting of an aluminum sheet, a copper sheet, and a stainless steel (SUS) sheet.

The thickness of the metal sheet may be 0.2 mm to 0.8 mm.

The diameter of the patterned perforations may be greater than 0.5 mm and less than 1.0 mm.

The transparent portion may include at least one resin selected from the group consisting of polycarbonate (PC), poly(methyl methacrylate) (PMMA), polycarbonate/polyethylene terephthalate glycol composite (PC/PETG), ABS (acrylonitrile butadiene styrene copolymer), and PC/ABS composite.

The patterned intaglios may be provided at respective positions corresponding to the patterned perforations and may be obliquely recessed upwards at a predetermined inclination angle from the rear surface of the light guide plate.

The diameter of the patterned intaglios may be larger than the diameter of the patterned perforations by an amount within a range greater than 0.05 mm and less than 0.3 mm.

The inclination angle may be 30° to 70°.

The light from the light source is incident on the light guide plate and is reflected through the three-dimensional pattern. The reflected light is radiated onto the panel body. The radiated light passes through the convex layers of the transparent portion, so the lighting pattern may be viewed in accordance with the shape of the patterned perforations.

Another embodiment of the present disclosure provides a method of manufacturing a vehicle panel. The method includes: manufacturing a perforated pattern portion by press-perforating a metal sheet to form a plurality of patterned perforations in the form of through-holes; attaching a protective tape to the upper surface of the perforated pattern portion; subjecting the perforated pattern portion having the protective tape attached thereto to sheet pressing; manufacturing a panel body by performing insert injection on the lower surface of the perforated pattern portion to integrate a transparent portion including a plate layer located on the lower surface of the perforated pattern portion and a plurality of convex layers provided in the plurality of patterned perforations with the perforated pattern portion; removing the protective tape; and locating a lighting unit so as to correspond to the panel body. The lighting unit includes a light guide plate provided at a corresponding position on the panel body and includes a plurality of patterned intaglios engraved in the rear surface thereof, and includes a light source provided at a lateral side of the light guide plate.

The press-perforating may be performed using a plurality of perforation pins to form a plurality of patterned perforations in the metal sheet.

The diameter of the perforation pins may be greater than 0.5 mm and less than 1.0 mm.

The tensile strength of the protective tape may be 30 N/cm or more.

The adhesive strength of the protective tape may be 3 N/cm or more.

The elongation of the protective tape may be 30% to 200%.

BRIEF DESCRIPTION OF THE DRAWINGS

The above and other features of the present disclosure are described in detail with reference to embodiments thereof illustrated in the accompanying drawings which are given hereinbelow by way of illustration only, and thus are not limitative of the present disclosure, and wherein.

Reference numerals set forth in the Drawings refer to the following elements, which are further discussed below:

| | |
|---|---|
| 1: vehicle panel | 10: panel body |
| 100: perforated pattern portion | 150: transparent portion |
| 20: lighting unit | 200: light guide plate |
| 250: light source | |

DETAILED DESCRIPTION

The above and other objectives, features, and advantages of the present disclosure should be more clearly understood from the following embodiments taken in conjunction with the accompanying drawings. However, the present disclosure is not limited to the embodiments disclosed herein and may be modified into different forms. These embodiments are provided to thoroughly explain the disclosure and to sufficiently transfer the spirit of the present inventive concept to those having ordinary skill in the art.

Throughout the drawings, the same reference numerals refer to the same or like elements. For the sake of clarity of the present disclosure, the dimensions of structures may be depicted as being larger than the actual sizes thereof.

It should be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it should be understood that, when an element such as a layer, film, area, or sheet is referred to as being "on" another element, it may be directly on the other element, or intervening elements may be present therebetween. Similarly, when an element, such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values within the stated range, including the end points. For example, the range of "5 to 10" should be understood to include any subranges, such as 6 to 10, 7 to 10, 6 to 9, 7 to 9 and the like, as well as individual values of 5, 6, 7, 8, 9 and 10. Such a range should also be understood to include any value between valid integers within the stated range, such as 5.5, 6.5, 7.5, 5.5 to 8.5, 6.5 to 9, and the like. Also, for example, the range of "10% to 30%" should be understood to include subranges, such as 10% to 15%, 12% to 18%, 20% to 30%, etc., as well as all integers including values of 10%, 11%, 12%, 13% and the like up to 30%. Such a range should also be understood to include any value between valid integers within the stated range, such as 10.5%, 15.5%, 25.5%, and the like.

When a component, device, element, or the like of the present disclosure is described as having a purpose or performing an operation, function, or the like, the component, device, or element should be considered herein as being "configured to" meet that purpose or to perform that operation or function.

Conventional lighting through characters or patterns using metals, etc. may be implemented through a complicated process. A complicated process, particularly a CNC (computer numerical control) process, enables various elaborate characters or patterns to be realized, but is disadvantageous in that the process is time-consuming and expensive, and may be applied only to relatively small parts.

Accordingly, the present inventors have made great efforts to solve the problems described above, and thus ascertained that a vehicle panel, manufactured so as to include a panel body as disclosed and described herein solves such problems. The body panel includes a perforated pattern portion including, as a perforated pattern, a plurality of patterned perforations formed by press-perforating a metal sheet under specific conditions and includes a transparent portion including a plate layer located on the lower surface of the perforated pattern portion and a plurality of convex layers formed in the plurality of patterned perforations. The vehicle panel also includes a lighting unit located so as to emit light from the inner surface of the panel body. The lighting unit includes a light guide plate including, as a three-dimensional pattern, a plurality of patterned intaglios engraved in the rear surface thereof. The vehicle panel may realize characters or patterns through the press-perforating process. Thus, a pattern may be realized through minimal means and a simple method, thus reducing the amount of time taken and the expense incurred for the production of a product. Moreover, large-area patterning is possible, so the process of the present disclosure is applicable to large parts. Additionally, a uniform lighting pattern may be realized, and emotional quality (e.g., aesthetic appearance and user satisfaction) may be improved when power is turned on/off, thereby completing a vehicle panel according to an embodiment.

Figure 1:
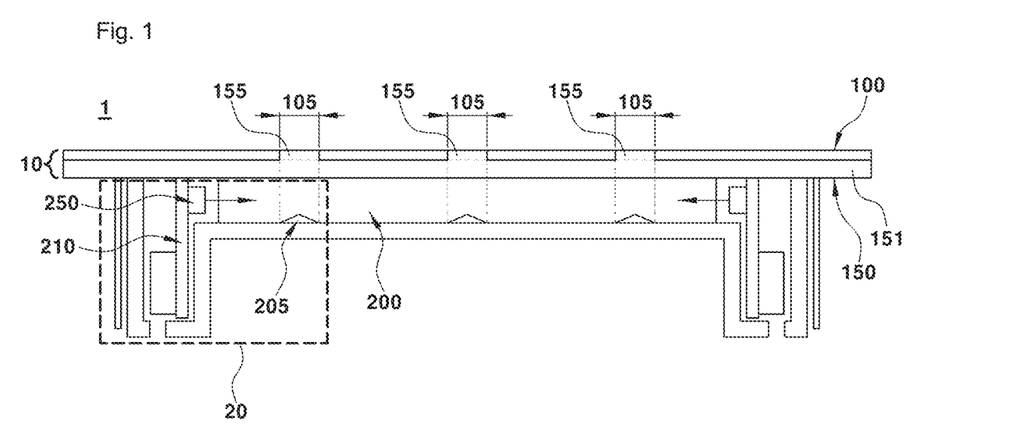
FIG. 1 is a cross-sectional view of a vehicle panel according to an embodiment.

FIG. 1 is a cross-sectional view of a vehicle panel according to an embodiment. With reference thereto, the vehicle panel 1 according to an embodiment includes a panel body 10 having a perforated pattern portion 100 including, as a perforated pattern, a plurality of patterned perforations 105 in the form of through-holes. The body panel 10 also includes a transparent portion 150 having a plate layer 151 located on the lower surface of the perforated pattern portion and a plurality of convex layers 155 formed in the plurality of patterned perforations. The vehicle panel 1 includes a lighting unit 20 located so as to emit light from the inner surface of the panel body. The lighting unit 20 includes a light guide plate 200, provided at a corresponding position on the panel body 10. The light guide plate 200 includes, as a three-dimensional pattern, a plurality of patterned intaglios 205 engraved in the rear surface thereof. The lighting unit 20 also includes a light source 250 provided at a lateral side of the light guide plate.

The panel body 10 is not particularly limited, so long as only a perforated pattern is viewed when power is turned off and a logical pattern with various designs is viewed when power is turned on, to thereby increase the emotional quality (e.g., aesthetic appearance and user experience) of metal parts (i.e., the vehicle panel).

The perforated pattern portion 100 of the panel body 10 may be located at the outermost position of the panel body and may include a plurality of patterned perforations 105 in the form of through-holes.

The shape of the patterned perforations 105 may vary depending on the shape of the perforation pins used for a press-perforating process. For example, a desired shape such as a circle, a triangle, a square, a rhombus, etc. may be obtained through the shape of the perforation pins, and it is not limited to only a specific shape.

The perforated pattern portion 100 may use a metal sheet in order to improve the emotional quality of metal parts. The metal sheet may be selected from the group consisting of, for example, an aluminum sheet, a copper sheet, a stainless steel (SUS) sheet, and other alloys, and is not limited to a specific metal sheet.

The thickness of the metal sheet should be a thickness that allows the press-perforating process without the metal sheet being torn by the press-perforating process, and in one example may be 0.2 mm to 0.8 mm. Out of the above range, if the thickness of the metal sheet is too low, the metal sheet may be torn during the press-perforating process, whereas if the thickness of the metal sheet is too high, the press-perforating process is impossible, which is undesirable.

The size of the shape of the patterned perforations, i.e., the diameter of the patterned perforations, may be measured based on the length of the largest radius on a basis of the center point of the shape of the patterned perforations. In one example, the diameter of the patterned perforations may be greater than 0.5 mm and less than 1.0 mm. Out of the above range, if the diameter of the patterned perforations is too small, the convex layers cannot be properly formed because the patterned perforations are not completely filled with the material for the transparent portion during insert injection with the transparent portion, so luminance may be lowered when the perforated pattern is viewed. On the other hand, if the diameter of the patterned perforations is too large, overflow of the material for the transparent portion beyond the outermost surface of the patterned perforations may occur during insert injection with the transparent portion.

The transparent portion 150 of the panel body 10 may be located on the lower surface of the perforated pattern portion or inside the patterned perforations and may emit light radiated from the light source through the portion located inside the patterned perforations.

Specifically, the transparent portion 150 may include a plate layer 151 located on the lower surface of the perforated pattern portion and a plurality of convex layers 155 formed inside the plurality of patterned perforations.

The light radiated from the light source cannot pass through the perforated pattern portion that is blocked with a metal sheet not having patterned perforations therein, corresponding to the plate layer. However, the light may pass through the plurality of convex layers formed inside the plurality of patterned perforations, and may thus be emitted.

Accordingly, the transparent portion may include a transparent material that is light-transmissive and is capable of transmitting light. For example, the transparent material may be at least one transparent resin selected from the group consisting of polycarbonate (PC), poly(methyl methacrylate) (PMMA), polycarbonate/polyethylene terephthalate glycol composite (PC/PETG), acrylonitrile butadiene styrene copolymer (ABS), and PC/ABS composite, but is not limited to including only a specific resin.

Also, the transparent portion may improve the three-dimensional effect of the perforated pattern in which light is transmitted and emitted through the addition of an additional pigment or a diffusing agent. The additional pigment may be, for example, carbon black, silica, titanium dioxide, an azo-based compound, a phthalocyanine-based compound, or the like.

Accordingly, the perforated pattern portion according to an embodiment includes patterned perforations having a diameter in a specific range for a metal sheet that satisfies the thickness conditions, etc. The transparent portion includes the plurality of convex layers formed inside the plurality of patterned perforations. Therefore, when power is turned off, the perforated pattern portion is visible as the perforated pattern, and when power is turned on, a logical pattern with various designs is viewed, thus effectively improving the emotional quality of metal parts.

The lighting unit 20 may be located so as to emit light from the inner surface of the panel body. The lighting device 2—may include a light guide plate 200 provided at a corresponding position on the panel body 10 and including a plurality of patterned intaglios 205 engraved in the rear surface thereof. The lighting device 20 may also include a light source 250 provided at a lateral side of the light guide plate and may further include a process control block (PCB) 210 directly connected to the light source to control the light source.

The light guide plate 200 is provided at a corresponding position on the panel body to receive light incident from the applied light source, change the direction of the light in a direction corresponding to the panel body, and radiate the light onto the panel body.

Specifically, the light may be effectively radiated onto the panel body from the light source through the plurality of patterned intaglios 205 engraved in the rear surface of the light guide plate.

To this end, the patterned intaglios may be provided at respective positions corresponding to the patterned perforations and may be obliquely recessed upwards at a predetermined inclination angle from the rear surface of the light guide plate. When the patterned intaglios are provided at positions corresponding to the patterned perforations, there is an advantage in that the luminance of the light emitted through the patterned perforations is consistent, so a uniform lighting pattern without variation in luminance may be realized.

The diameter of the patterned intaglios may be larger than the diameter of the patterned perforations. If the diameter of the patterned intaglios is smaller than the diameter of the patterned perforations, the light from the light source cannot be effectively radiated in the direction corresponding to the panel body. Specifically, the diameter of the patterned intaglios may be larger than the diameter of the patterned perforations by an amount within a range greater than 0.05 mm and less than 0.3 mm. Accordingly, the diameter of the patterned intaglios may be greater than 0.55 mm and less than 1.3 mm. Out of the above range, if the diameter of the patterned intaglios is too small or too large, the luminance may be lowered.

Also, the depth of the patterned intaglios may be determined depending on the obliquely recessed angle of inclination, and it may be possible to adjust the inclination angle so as to form a depth that enables the light from the light source to be radiated by effectively reflecting the light in the corresponding direction of the panel body. Specifically, the inclination angle that determines the depth of the patterned intaglios may be 30° to 70°. Out of the above range, if the inclination angle is too low, the light may be transmitted, whereas if the inclination angle is too high, the light may be reflected back. Out of the above range, there is a disadvantage in that the luminance of the light emitted from the perforated metal portion decreases.

The vehicle panel according to an embodiment is configured such that the lighting unit includes the light guide plate including the plurality of patterned intaglios having specific conditions in the rear surface thereof. Thus, there is an advantage in that a uniform lighting pattern without variation in luminance may be realized.

The light source 250 included in the lighting unit is not particularly limited, so long as it is provided at the lateral side of the light guide plate and is able to emit light. The light source according to the present disclosure may be exemplified by an LED capable of emitting light in various colors (red/blue/white, etc.), and may be configured to be turned on at the same time as a car headlight or taillight, which is mainly turned on at night. When the driver operates a multi-function switch to turn on the headlights or the taillights, the circuit may be configured so that the light source is turned on by receiving vehicle power at the same time.

The process control block (PCB) 210 may be directly connected to the light source to control the light source. For example, when the lighting logic is coded and stored in the PCB, the corresponding logic is executed in response to the switch signal operated by the driver, and the lighting is implemented according to a previously stored manner.

For the vehicle panel according to an embodiment, the light of the light source is incident on the light guide plate and reflected through the three-dimensional pattern, the reflected light is radiated onto the panel body, and the radiated light passes through the convex layers of the transparent portion. Thus, the lighting pattern may be viewed in accordance with the shape of the patterned perforations.

Here, the vehicle panel according to an embodiment includes the perforated pattern portion having a perforated pattern and the light guide plate having a three-dimensional intaglio pattern manufactured under specific conditions. Thus, a uniform lighting pattern without variation in luminance may be realized. When the power is turned off, only the perforated pattern is viewed, and when the power is turned on, a logical pattern with various designs is viewed, thus improving the emotional quality of metal parts.

In addition, a method of manufacturing the vehicle panel according to another embodiment includes manufacturing a perforated pattern portion by press-perforating a metal sheet to form a plurality of patterned perforations in the form of through-holes. The method also includes attaching a protective tape to the upper surface of the perforated pattern portion and subjecting the perforated pattern portion having the protective tape attached thereto to sheet pressing. The method further includes manufacturing a panel body by performing insert injection on the lower surface of the perforated pattern portion to integrate a transparent portion including a plate layer located on the lower surface of the perforated pattern portion and a plurality of convex layers provided in the plurality of patterned perforations with the perforated pattern portion. The method also includes removing the protective tape and locating a lighting unit so as to correspond to the panel body. Here, the method of manufacturing the vehicle panel according to another embodiment may include contents that substantially overlap those related to the vehicle panel according to an embodiment. A description of overlapping contents has been omitted.

The manufacturing the perforated pattern portion is a step of manufacturing a perforated pattern portion by press-perforating a metal sheet to form a plurality of patterned perforations in the form of through-holes. Here, the press-perforating process may be performed using a plurality of perforation pins to form a plurality of patterned perforations in the metal sheet. The perforation pins may be manufactured to have the same shape and diameter as those of the intended patterned perforations. The diameter of the perforation pins may be greater than 0.5 mm and less than 1.0 mm. Out of the above range, if the diameter of the perforation pins is too small, the perforation pins may break during the press-perforating process and the press-perforating process cannot be performed, whereas if the diameter of the perforation pins is too large, the metal sheet may tear during the press-perforating process.

The method of manufacturing the vehicle panel according to another embodiment is advantageous in that a character or pattern may be implemented through the press-perforating process. Thus, a pattern may be realized through minimal means and a simple method.

Then, before attaching the protective tape, the method may further include cutting the perforated metal sheet to a desired predetermined size.

The attaching the protective tape to the upper surface of the perforated pattern portion is a step of attaching the protective tape to the upper surface of the perforated pattern portion, which is the press-perforated metal sheet, in order to prevent overflow of the resin during subsequent insert injection.

The protective tape is not particularly limited, so long as it is able to prevent overflow of the transparent resin. The protective tape may be configured, for example, such that an adhesive of a component that adheres to the surface of aluminum is attached to the back of a metal thin film having a glass transition temperature of 100° C. or higher or a film made of a polymer material.

Here, in order to prevent overflow of the resin during insert injection, the protective tape has to possess physical properties such as tensile strength, adhesive strength, and elongation sufficient to withstand the flow pressure of the resin.

Specifically, the tensile strength of the protective tape may be 30 N/cm or more, and in one example may be 40 N/cm to 70 N/cm. Out of the above range, if the tensile strength of the protective tape is too low, tearing may occur during press injection despite the protective tape being attached to the perforated pattern portion. On the other hand, if the tensile strength of the protective tape is too high, the tape may peel off in highly stretched sections.

Also, the adhesive strength of the protective tape may be 3 N/cm or more, and in one example may be 4 N/cm to 10 N/cm. Out of the above range, if the adhesive strength of the protective tape is too low, the protective tape may peel off during subsequent pressing. On the other hand, if the adhesive strength of the protective tape is too high, the protective tape may not be detached easily after pressing, thereby lowering work efficiency.

Also, the elongation of the protective tape may be 30% to 200% for the purpose of subsequent sheet pressing. Out of the above range, if the elongation of the protective tape is too low, the tape may break during subsequent pressing, whereas if the elongation of the protective tape is too high, it is difficult to remove the protective tape after pressing.

After attaching the protective tape, the sheet pressing step may be performed before insert injection. Sheet pressing is a step of not only cutting out unnecessary edges, but also forming the desired product shape.

In the manufacturing the panel body, the prepared transparent resin is insert-injected on the lower surface of the perforated pattern portion. Thus, a transparent portion, including a plate layer located on the lower surface of the perforated pattern portion and a plurality of convex layers provided inside the plurality of patterned perforations, is integrated with the perforated pattern portion, thus manufacturing the panel body.

As used herein, the term "insert injection" refers to an injection-molding process in which a metal sheet including patterned perforations, which is a part not made of plastic, is located at a desired position in a mold for injection and then a resin such as plastic is injected into the mold to realize integration.

Through the insert injection, not only the plate layer located on the lower surface of the perforated pattern portion but also the plurality of convex layers formed by injecting the resin into the plurality of patterned perforations of the metal sheet may be formed.

Here, the protective tape is capable of withstanding the flow pressure of the resin due to insert injection. The convex layers may be appropriately formed through the diameter of patterned perforations and the physical properties of the protective tape, so the luminance of the lighting pattern is excellent.

After properly forming the convex layers, the protective tape may be removed from the upper surface of the perforated pattern portion.

Then, as shown in FIG. 1, a lighting unit may be located so as to correspond to the panel body.

Figure 2A:
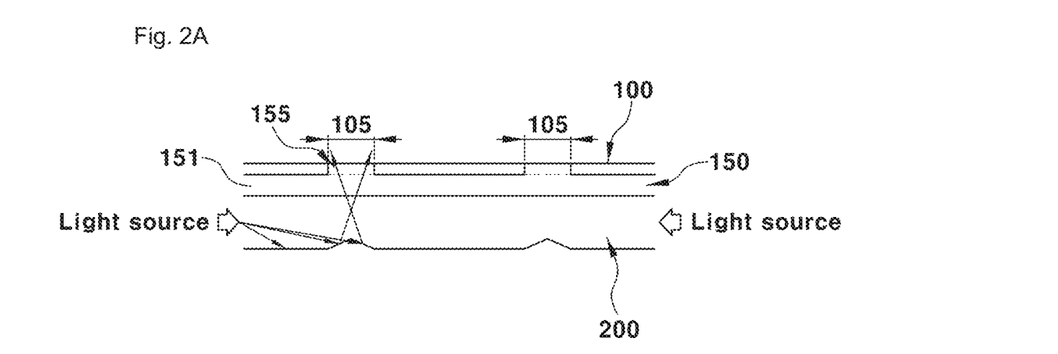
FIG. 2A is an enlarged cross-sectional view of a panel body and a light guide plate of the vehicle panel according to an embodiment.

FIG. 2A is an enlarged cross-sectional view of the panel body and the light guide plate of the vehicle panel according to an embodiment. With reference to FIG. 2A, the light guide plate including a plurality of patterned intaglios engraved in the rear surface thereof may be provided at a corresponding position on the panel body. Accordingly, the plurality of patterned intaglios is provided at respective positions corresponding to the patterned perforations of the perforated pattern portion, so a uniform lighting pattern without variation in luminance may be realized. Here, the process for engraving the patterned intaglios in the rear surface of the light guide plate may be etching, corrosion in a mold, or the like.

Also, the light source may be disposed at the lateral side of the light guide plate. Additionally, a process control block 210 (PCB) directly connected to the light source may be disposed adjacent thereto.

In the method of manufacturing the vehicle panel according to another embodiment, characters or patterns may be implemented through the press-perforating process. Thus, a pattern may be realized through minimal means and a simple method, whereby the amount of time taken and the expense incurred for the production of a product may be reduced. The method enables large-area patterning and is thus applicable to large parts.

A better understanding of the present disclosure may be obtained through the following examples. These examples are merely set forth to illustrate the present disclosure and are not to be construed as limiting the scope of the present disclosure.

Example 1

Manufacture of Vehicle Panel

A perforated pattern portion was manufactured as follows.

An aluminum sheet was prepared as a metal sheet having a thickness of 0.6 mm. A press-perforating process was performed using a plurality of perforation pins having a diameter of 0.7 mm and a circular shape, thus forming a perforated pattern portion, which is a metal sheet. The metal sheet included, as a perforated pattern, a plurality of patterned perforations having a diameter of 0.7 mm and a circular shape.

Then, the metal sheet was cut, after which a protective tape made of a polyester film containing a silicon component and having a thickness of 0.05 mm was attached to the upper surface of the perforated pattern portion. Here, the tensile strength of the protective tape was 46.3 N/cm, the adhesive strength thereof was 4.1 N/cm, and the elongation thereof was 100%.

Then, sheet pressing was performed on the perforated pattern portion having the protective tape attached thereto. Afterwards, insert injection of a polycarbonate (PC) resin was performed so that a transparent portion including a plate layer located on the lower surface of the perforated pattern portion and a plurality of convex layers provided in the plurality of patterned perforations was integrated with the perforated pattern portion to manufacture a panel body.

Then, a three-dimensional pattern, particularly a plurality of patterned intaglios obliquely recessed upwards at a predetermined inclination angle from the rear surface of the light guide plate was engraved at respective positions corresponding to the patterned perforations. Then, the light guide plate was provided at a corresponding position on the panel body. Here, the diameter of the patterned intaglios was 0.85 mm, and the inclination angle was 42°.

Then, an LED light source was located at the lateral side of the light guide plate, after which a process control block (PCB) was directly connected to the light source and located adjacent thereto.

Comparative Example 1

Manufacture of Blasted Vehicle Panel

Figure 2B:
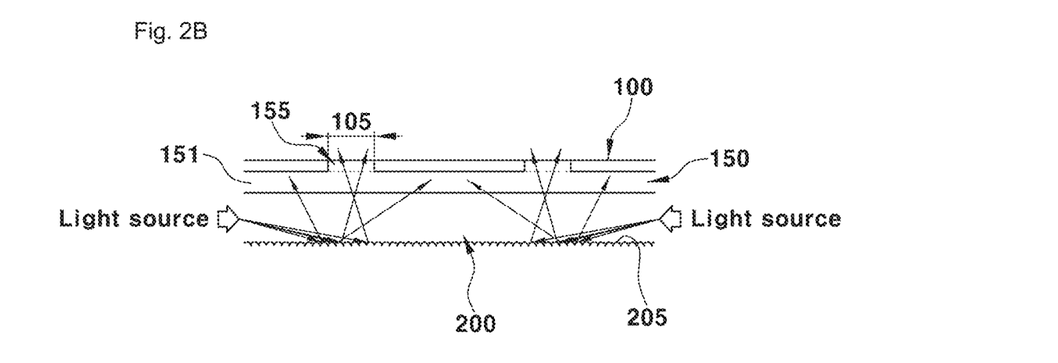
FIG. 2B is an enlarged cross-sectional view of a panel body and a light guide plate of the vehicle panel according to Comparative Example 1.

A vehicle panel was manufactured in the same manner as in Example 1, with the exception that the three-dimensional pattern of the light guide plate was formed through conventional blasting, as shown in FIG. 2B, rather than engraving the plurality of patterned intaglios as the three-dimensional pattern of the light guide plate at respective positions corresponding to the patterned perforations, in contrast with Example 1.

Comparative Examples 2 to 5

Manufacture of Vehicle Panels Having Different Diameters of Patterned Perforations Respective vehicle panels were manufactured in the same manner as in Example 1, with the exception that the diameter of the patterned perforations was 0.3 mm (Comparative Example 2), 0.5 mm (Comparative Example 3), 1.0 mm (Comparative Example 4), and 1.5 mm (Comparative Example 5), rather than 0.7 mm in Example 1.

Test Example 1

Analysis of Variation in Luminance of Lighting Pattern at Each Position of Vehicle Panel Depending on Three-Dimensional Pattern The vehicle panels according to Example 1 and Comparative Example 1 were manufactured, positions on portions of each vehicle panel were set, the luminance of the lighting pattern at the positions on the portions thereof was analyzed, and the variation in luminance thereof was analyzed. The results thereof are shown in Table 1 below and in FIGS. 3A and 3B.

Figure 3A:
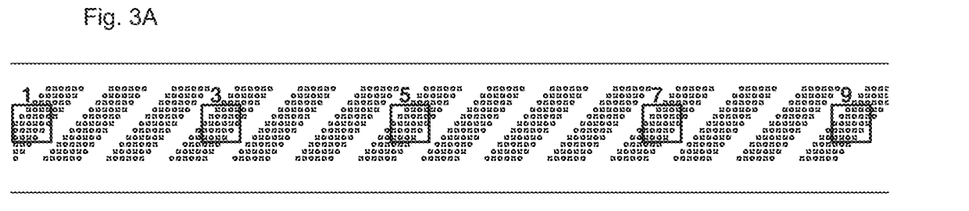
FIG. 3A is an image showing a lighting pattern of the vehicle panel according to Example 1.
Figure 3B:
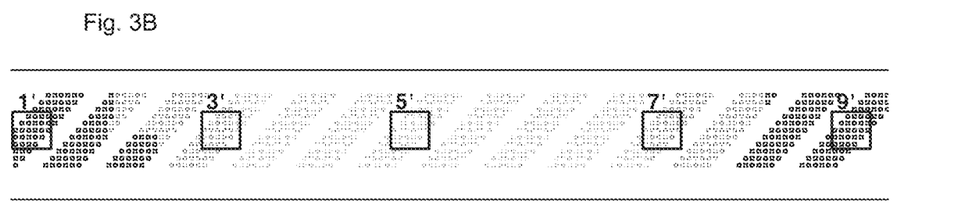
FIG. 3B is an image showing a lighting pattern of the vehicle panel according to Comparative Example 1.
Figure 4A:
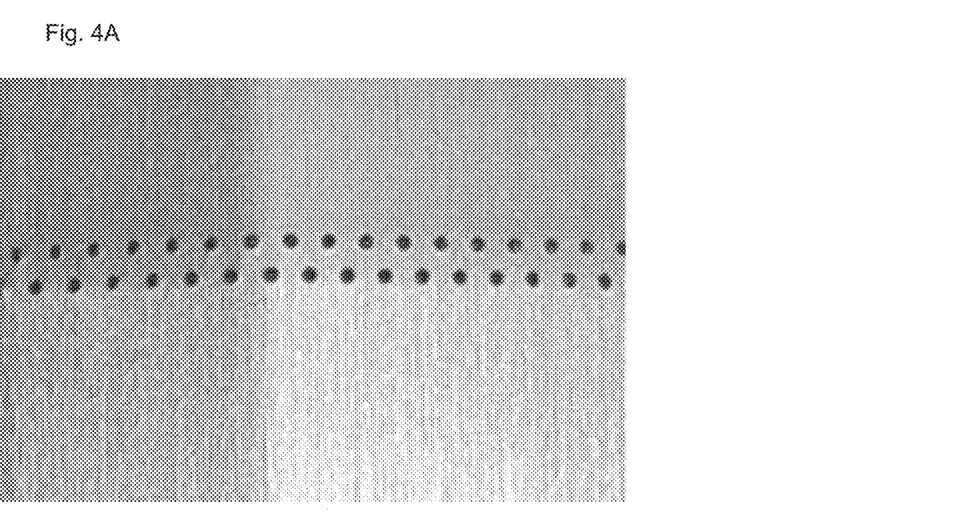
FIGS. 4A-4E are images showing the surfaces of the perforated pattern portions according to Comparative Example 2 (0.3 mm), Comparative Example 3 (0.5 mm), Example 1 (0.7 mm), Comparative Example 4 (1.0 mm), and Comparative Example 5 (1.5 mm)
Figure 4B:
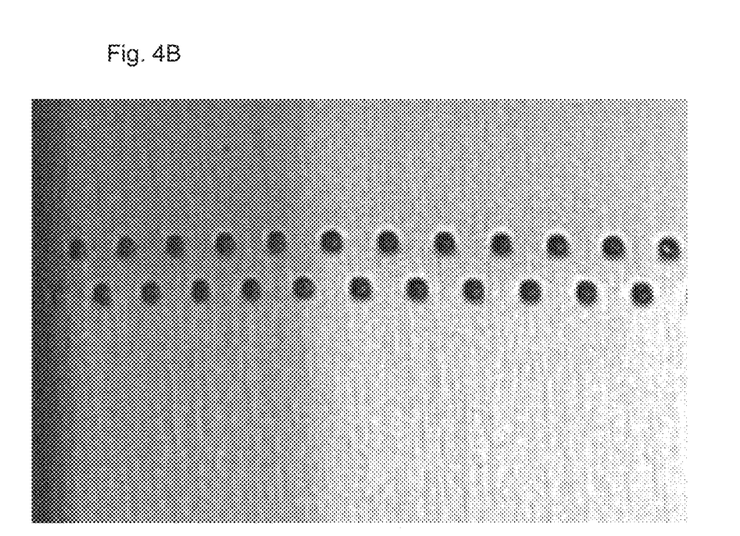
Figure 4C:
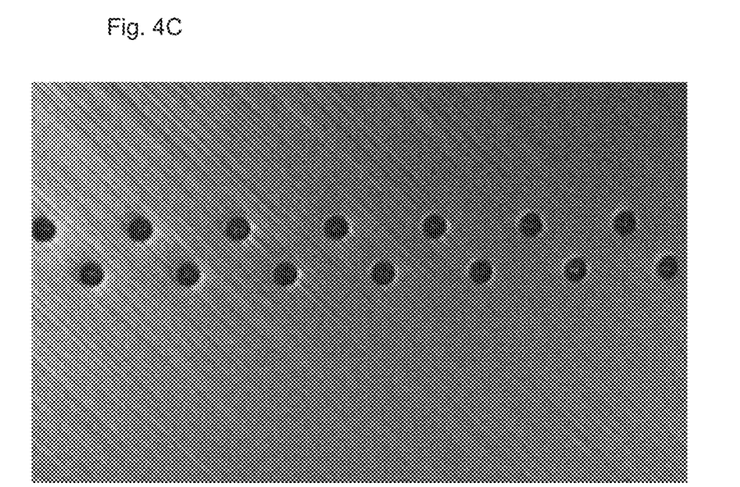
Figure 4D:
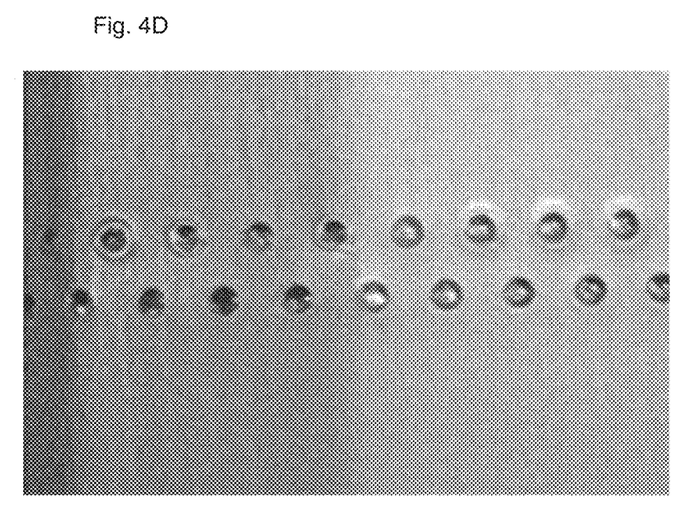
Figure 4E:
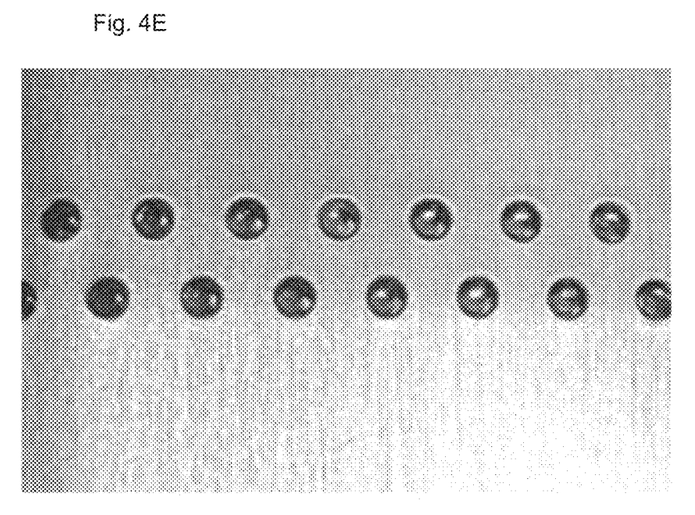
Figure 5A:
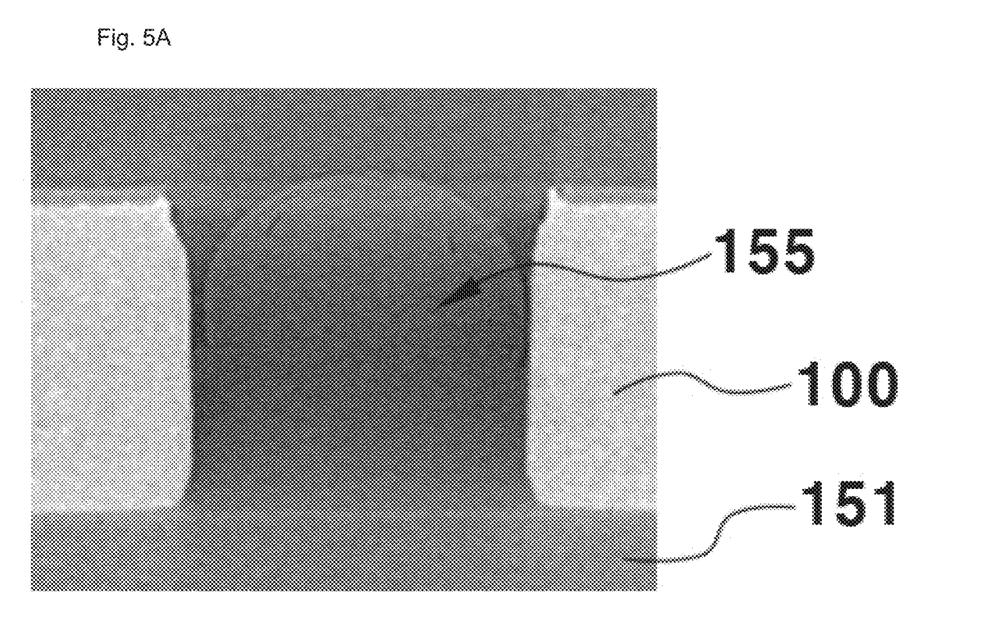
FIGS. 5A-5E are images showing the cross-sections of the perforated pattern portions and the convex layers of the transparent portions according to Comparative Example 2 (0.3 mm), Comparative Example 3 (0.5 mm), Example 1 (0.7 mm), Comparative Example 4 (1.0 mm), and Comparative Example 5 (1.5 mm).
Figure 5B:
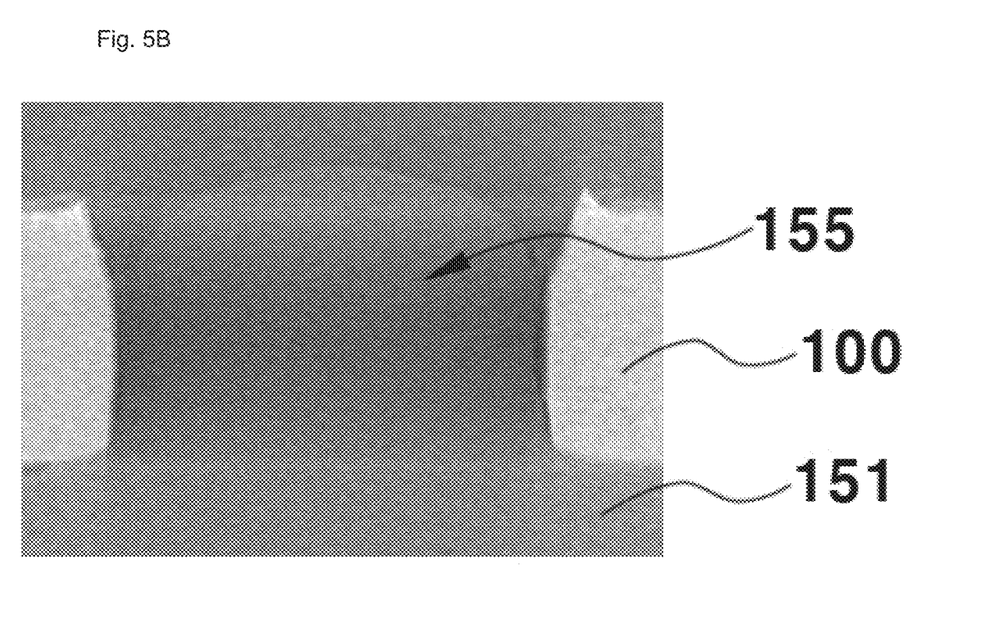
Figure 5C:
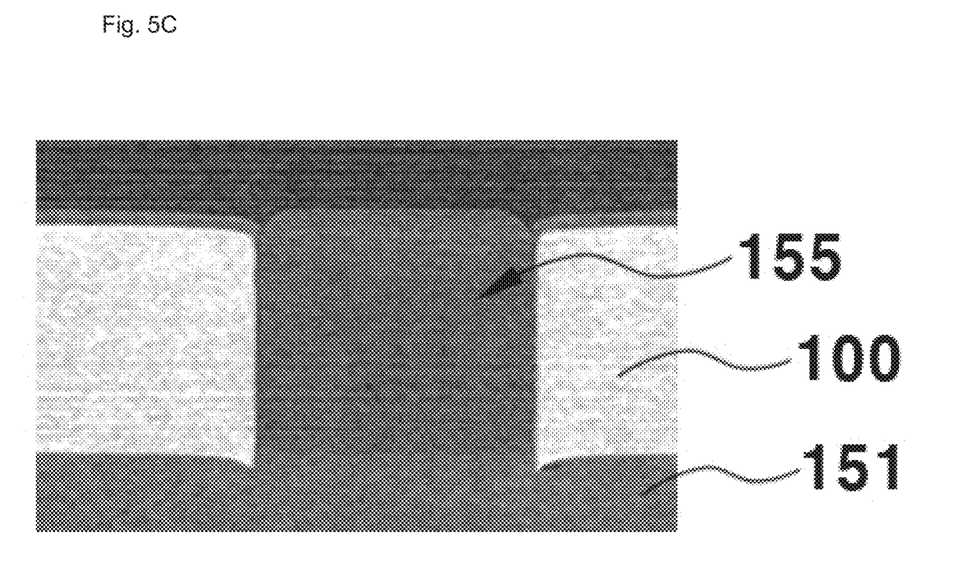
Figure 5D:
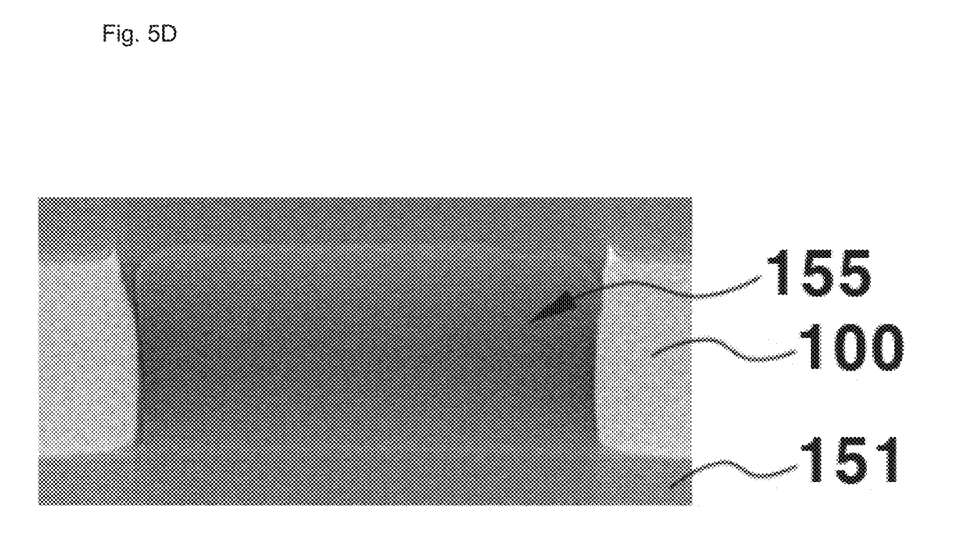
Figure 5E:
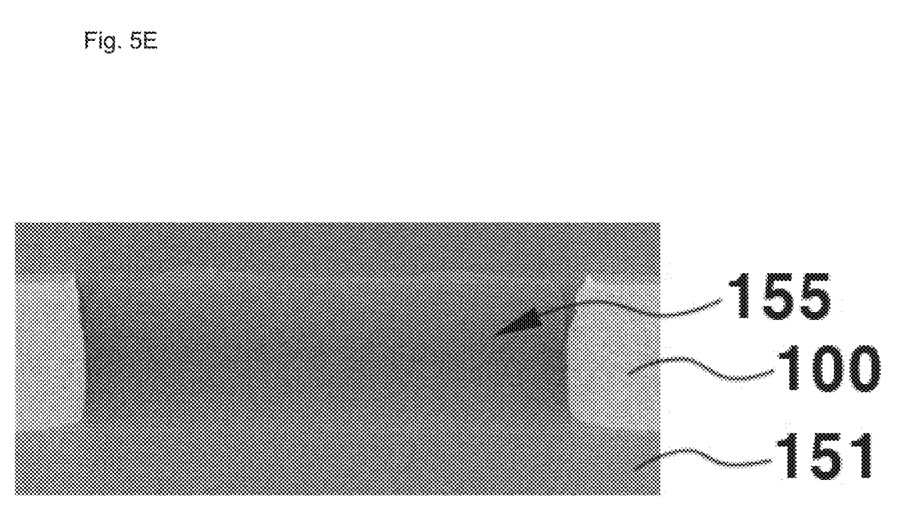

Specifically, FIG. 3A is an image showing the lighting pattern of the vehicle panel according to Example 1, and FIG. 3B is an image showing the lighting pattern of the vehicle panel according to Comparative Example 1.

TABLE 1

| | Classification of position on portion (luminance; cd) | | | | | |
|---|---|---|---|---|---|---|
| 1 1' | 3 3' | 5 5' | 7 7' | 9 9' | Average | Standard Deviation |
| Example 1 184.1 | 121.7 | 107.4 | 127.3 | 169.0 | 141.9 | 29.4 |
| Comparative Example 1 200.9 | 70.0 | 36.3 | 56.0 | 152.9 | 103.2 | 63.0 |

As is apparent from Table 1 and FIGS. 3A and 3B, it was confirmed that the average luminance of the positions on the portions of the vehicle panel according to Example 1 was generally high and the standard deviation was small. Whereas the average luminance of the positions on the portions of the vehicle panel according to Comparative Example 1 was relatively low and the standard deviation was large. With reference to FIGS. 2A and 2B, in the vehicle panel according to Example 1, the patterned intaglios as the three-dimensional pattern of the light guide plate were engraved and located corresponding to the positions of the patterned perforations. Thus, he light from the light source was directly reflected and radiated to the patterned perforations, whereby the luminance of the lighting pattern was high. However, in the vehicle panel according to Comparative Example 1, since the three-dimensional pattern was not engraved in the light guide plate so as to correspond to the positions of the patterned perforations, there occurred cases in which the light from the light source was scattered and thus not directly reflected or not radiated to the patterned perforations, and thus the variation in luminance of the lighting pattern was large.

Test Example 2

Evaluation of Appearance of Vehicle Panel Depending on Diameter of Patterned Perforations The vehicle panels according to Example 1 and Comparative Examples 2 to 5 were manufactured, and the shapes of the surfaces and cross-sections of the perforated pattern portions as the appearances thereof were analyzed. The results thereof are shown in FIGS. 4A to 4E and 5A to 5E.

Specifically, FIGS. 4A-4E are images showing the surfaces of the perforated pattern portions according to Comparative Example 2 (0.3 mm), Comparative Example 3 (0.5 mm), Example 1 (0.7 mm), Comparative Example 4 (1.0 mm), and Comparative Example 5 (1.5 mm), and FIGS. 5A to 5E are images showing the cross-sections of the perforated pattern portions and the convex layers of the transparent portions according to Comparative Example 2 (0.3 mm), Comparative Example 3 (0.5 mm), Example 1 (0.7 mm), Comparative Example 4 (1.0 mm), and Comparative Example 5 (1.5 mm).

With reference thereto, in the vehicle panels according to Comparative Example 2 (0.3 mm) and Comparative Example 3 (0.5 mm), in which the diameter of the patterned perforations was smaller than that of Example 1, the resin overflow phenomenon did not occur, but the resin was not charged to the extent of completely filling the patterned perforations.

On the other hand, in the vehicle panels according to Comparative Example 4 (1.0 mm) and Comparative Example 5 (1.5 mm), in which the diameter of the patterned perforations was greater than that of Example 1, the resin overflow phenomenon occurred despite the presence of the protective tape.

Therefore, it was confirmed that, when the diameter of the patterned perforations was greater than 0.5 mm and less than 1.0 mm, the luminance of the lighting pattern was high, and resin overflow did not occur.

The vehicle panel according to an embodiment includes a perforated pattern portion having a perforated pattern and a light guide plate having a three-dimensional intaglio pattern manufactured under specific conditions, so a uniform lighting pattern without variation in luminance can be realized. When power is turned off, only the perforated pattern is viewed, whereas when power is turned on, a logical pattern with various designs is viewed, thus improving the emotional quality of metal parts, rendering the metal parts aesthetically pleasing.

As is apparent from the above description, the vehicle panel according to an embodiment includes a perforated pattern portion having a perforated pattern and a light guide plate having a three-dimensional intaglio pattern manufactured under specific conditions, so a uniform lighting pattern without variation in luminance can be realized. Moreover, when power is turned off, only the perforated pattern is viewed, and when power is turned on, a logical pattern with various designs is viewed, advantageously improving the emotional quality of metal parts.

In addition, the method of manufacturing the vehicle panel according to another embodiment enables characters or patterns to be implemented through a press-perforating process. Thus, a pattern can be realized through minimal means and a simple method, thereby reducing the amount of time taken and the expense incurred for the production of a product. Also, since large-area patterning is possible, the method of the present disclosure can be applied to large parts.

The disclosure has been described in detail with reference to embodiments thereof. However, it should be appreciated by those having ordinary skill in the art that changes may be made in these embodiments without departing from the principles or spirit of the disclosure, the scope of which is defined in the appended claims and their equivalents.

What is claimed is:

1. A vehicle panel, comprising:
    a panel body comprising a perforated pattern portion including, as a perforated pattern, a plurality of patterned perforations in a form of through-holes and a transparent portion including a plate layer located on a lower surface of the perforated pattern portion and a plurality of convex layers formed in the plurality of patterned perforations; and
    a lighting unit located so as to emit light from inside the panel body,
    wherein the lighting unit comprises a light guide plate provided at a position corresponding to the panel body and including, as a three-dimensional pattern, a plurality of patterned intaglios engraved in a rear surface thereof, and includes a light source provided at a lateral side of the light guide plate,
    wherein the patterned intaglios are provided at respective positions corresponding to the patterned perforations and are obliquely recessed upwards at a predetermined inclination angle from the rear surface of the light guide plate,
    wherein a diameter of the patterned perforations is greater than 0.5 mm and less than 1.0 mm, and
    wherein the diameter of the patterned intaglios is larger than the diameter of the patterned perforations.

2. The vehicle panel of claim 1, wherein the perforated pattern portion is a metal sheet selected from the group consisting of an aluminum sheet, a copper sheet, and a stainless steel (SUS) sheet.

3. The vehicle panel of claim 2, wherein a thickness of the metal sheet is 0.2 mm to 0.8 mm.

4. The vehicle panel of claim 1, wherein the transparent portion comprises at least one resin selected from the group consisting of polycarbonate (PC), poly(methyl methacrylate) (PMMA), polycarbonate/polyethylene terephthalate glycol composite (PC/PETG), acrylonitrile butadiene styrene copolymer (ABS), and PC/ABS composite.

5. The vehicle panel of claim 1, wherein a diameter of the patterned intaglios is larger than a diameter of the patterned perforations by an amount within a range greater than 0.05 mm and less than 0.3 mm.

6. The vehicle panel of claim 1, wherein the inclination angle is 30° to 70°.

7. The vehicle panel of claim 1, wherein light from the light source is incident on the light guide plate and is reflected through the three-dimensional pattern, wherein the reflected light is radiated onto the panel body, and wherein the radiated light passes through the convex layers of the transparent portion, so a lighting pattern is viewed in accordance with a shape of the patterned perforations.

8. A method of manufacturing a vehicle panel, the method comprising:
    manufacturing a perforated pattern portion by press-perforating a metal sheet to form a plurality of patterned perforations in a form of through-holes;
    attaching a protective tape to an upper surface of the perforated pattern portion;
    subjecting the perforated pattern portion having the protective tape attached thereto to sheet pressing;
    manufacturing a panel body by performing insert injection on a lower surface of the perforated pattern portion to integrate a transparent portion including a plate layer located on the lower surface of the perforated pattern portion and a plurality of convex layers provided in the plurality of patterned perforations with the perforated pattern portion;
    removing the protective tape; and
    locating a lighting unit so as to correspond to the panel body,
    wherein the lighting unit comprises a light guide plate provided at a position corresponding to the panel body and including a plurality of patterned intaglios engraved in a rear surface thereof, and includes a light source provided at a lateral side of the light guide plate,
    wherein the patterned intaglios are provided at respective positions corresponding to the patterned perforations and are obliquely recessed upwards at a predetermined inclination angle from the rear surface of the light guide plate,
    wherein a diameter of the patterned perforations is greater than 0.5 mm and less than 1.0 mm, and
    wherein the diameter of the patterned intaglios is larger than the diameter of the patterned perforations.

9. The method of claim 8, wherein the press-perforating is performed using a plurality of perforation pins to form a plurality of the patterned perforations in the metal sheet.

10. The method of claim 9, wherein a diameter of the perforation pins is greater than 0.5 mm and less than 1 mm.

11. The method of claim 8, wherein a tensile strength of the protective tape is 30 N/cm or more.

12. The method of claim 8, wherein an adhesive strength of the protective tape is 3 N/cm or more.

13. The method of claim 8, wherein an elongation of the protective tape is 30% to 200%.

* * * * *